(12) United States Patent
Sasaki et al.

(10) Patent No.: US 9,509,424 B2
(45) Date of Patent: Nov. 29, 2016

(54) COMMUNICATION TERMINAL AND INFORMATION PROVIDING METHOD

(75) Inventors: Makoto Sasaki, Chiyoda-ku (JP);
Hiroki Shikama, Chiyoda-ku (JP);
Takeshi Higuchi, Chiyoda-ku (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 13/879,832

(22) PCT Filed: Jun. 26, 2012

(86) PCT No.: PCT/JP2012/066289
§ 371 (c)(1),
(2), (4) Date: Apr. 17, 2013

(87) PCT Pub. No.: WO2013/008618
PCT Pub. Date: Jan. 17, 2013

(65) Prior Publication Data
US 2013/0225115 A1    Aug. 29, 2013

(30) Foreign Application Priority Data
Jul. 11, 2011 (JP) .................................. 2011-153295

(51) Int. Cl.
*H04W 4/02* (2009.01)
*H04M 11/04* (2006.01)
(Continued)

(52) U.S. Cl.
CPC .............. *H04H 60/70* (2013.01); *G08B 27/00* (2013.01); *G08B 27/006* (2013.01); *H04H 20/59* (2013.01);
(Continued)

(58) Field of Classification Search
CPC ....... H04H 60/70; H04H 20/59; H04W 4/22; H04W 4/021; H04W 4/06; H04W 64/006; H04W 76/007; G08B 27/00; G08B 27/006; H04M 1/72536; H04M 3/5166; H04M 11/04

USPC ................... 340/540; 702/3; 455/3.01, 404.1
See application file for complete search history.

(56) References Cited

U.S. PATENT DOCUMENTS 7,263,442 B2 * 8/2007 Eckel ............................... 702/3
8,300,560 B2 * 10/2012 Nowlan .................. H04W 4/22
370/270

(Continued)

FOREIGN PATENT DOCUMENTS

JP      7 220196      8/1995
JP      0722196    *  8/1995

(Continued)

OTHER PUBLICATIONS

Nakao, M., et al., "Emergency Information Broadcasting Distribution System," NTT DOCOMO Technical Journal, vol. 15, No. 4, Total 12 Pages, (2008) (with official partial English translation published as NTT DOCOMO Technical Journal, vol. 9, No. 4).

(Continued)

*Primary Examiner* — Lester Kincaid
*Assistant Examiner* — Gary Lafontant
(74) *Attorney, Agent, or Firm* — Oblon, McClelland, Maier & Neustadt, L.L.P.

(57) ABSTRACT

A communication terminal includes a receiver for receiving a communication signal including urgent warning information, a current location information retrieving unit that retrieves location information regarding a current location of a user, a storage unit that stores information regarding a registered point specified by the user or a communication system, a processing unit that calculates a distance between the current location and the registered point, in response to receiving by the receiving unit of the communication signal, and an information providing unit that provides to-be-provided information including, at least, the distance to the user.

10 Claims, 6 Drawing Sheets

(51) Int. Cl.
| | |
|---|---|
| H04H 60/70 | (2008.01) |
| G08B 27/00 | (2006.01) |
| H04W 4/22 | (2009.01) |
| H04H 20/59 | (2008.01) |
| H04M 3/51 | (2006.01) |
| H04M 1/725 | (2006.01) |
| H04W 4/06 | (2009.01) |
| H04W 64/00 | (2009.01) |

(52) U.S. Cl.
CPC ............ *H04M 3/5166* (2013.01); *H04W 4/22* (2013.01); *H04M 1/72536* (2013.01); *H04M 11/04* (2013.01); *H04W 4/021* (2013.01); *H04W 4/06* (2013.01); *H04W 64/006* (2013.01)

(56) References Cited

U.S. PATENT DOCUMENTS

| | | | |
|---|---|---|---|
| 2002/0118118 A1 | 8/2002 | Myllymaki et al. | |
| 2008/0205695 A1* | 8/2008 | Saito | 382/100 |
| 2009/0243845 A1* | 10/2009 | Kagawa | 340/540 |
| 2009/0309742 A1 | 12/2009 | Alexander et al. | |
| 2012/0190295 A1* | 7/2012 | Kim | H04W 4/22 455/3.01 |

FOREIGN PATENT DOCUMENTS

| | | |
|---|---|---|
| JP | 2002 165034 | 6/2002 |
| JP | 2002165034 A * | 6/2002 |
| JP | 2003 242580 | 8/2003 |
| JP | 2009 36621 | 2/2009 |
| JP | 2009 63336 | 3/2009 |
| WO | WO 2007/018305 A1 | 2/2007 |

OTHER PUBLICATIONS

International Search Report Issued Aug. 21, 2012 in PCT/JP12/66289 filed Jun. 26, 2012.
Combined Chinese Office Action and Search Report issued Sep. 2, 2014 in Patent Application No. 201280004098.7 (with English Translation).
Extended Search Report issued Feb. 20, 2015, 2015, in EP 12810567.3.
Office Action mailed Mar. 24, 2015, in Chinese Patent Application No. 201280004098.7 (with English-language translation).
Office Action issued Sep. 9, 2014 in Japanese Patent Application No. 2011-153295 (with English language translation).
Office Action issued Aug. 5, 2015 in Chinese Patent Application No. 201280004098.7 (with English language translation).
European Examination dated Sep. 19, 2016 in Patent Application No. 12 810 567.3.

* cited by examiner

FIG.2B

| | REGISTERED POINT | | |
|---|---|---|---|
| DISASTER MODE 1 | REGISTERED POINT 11 | REGISTERED POINT 12 | REGISTERED POINT 13 |
| DISASTER MODE 2 | REGISTERED POINT 21 | | |
| DISASTER MODE 3 | REGISTERED POINT 31 | REGISTERED POINT 32 | |

FIG.4

COMMUNICATION TERMINAL AND INFORMATION PROVIDING METHOD

TECHNICAL FIELD

An aspect of the present disclosure relates to a communication terminal and an information providing method.

BACKGROUND ART

Recently, unprecedented natural disasters have occurred domestically and internationally, and interest regarding countermeasures against disasters is growing more than before. To reduce the damage caused by such disasters, many communication systems report the state of emergency to many users by simultaneously broadcasting urgent warning information. Non-Patent Document 1 discloses such a broadcast communication service.

A typical example of the urgent warning information is the Earthquake Early Warning issued by the Japan Meteorological Agency. The Earthquake Early Warning includes information indicating, for example, the epicenter and the magnitude of the earthquake. The urgent warning information is important, but the urgent warning information is general information related to all the users.

Since the users are served at various locations in the communication system, the ways to behave after receiving the urgent warning information are not the same for the individual users. For example, the evacuation methods are not the same for all the users receiving the Earthquake Early Warning.

Regarding evacuation guidance to individual users, according to the invention disclosed in Patent Document 1, during an emergency, an emergency information reporting device distributes Java (registered trade mark) application programs for reporting emergency information to mobile telephone terminals through base stations.

The mobile telephone terminal downloads it, and returns location information to the emergency information reporting device. The emergency information reporting device creates map information including an evacuation area and an evacuation route based on the location information, and transmits the map information to the mobile telephone terminal. In this manner, it is possible to provide an evacuation route to a user who does not know the evacuation route.

RELATED ART DOCUMENT

Patent Document

Patent Document 1: Japanese Unexamined Patent Publication No. 2003-242580 (Abstract, claim 1, and paragraph [0045])

Non-Patent Document

Non-Patent Document 1: NTT DOCOMO, Technical Journal Vol. 15, No. 4, 2008

SUMMARY OF THE INVENTION

Problem to be Solved by the Invention

According to the invention disclosed in Patent Document 1, until the user retrieves the map information of the evacuation route, several procedures may be required such as the downloading procedure of the Java (registered trademark) application program for reporting the emergency information, the retrieving and reporting procedure of the location information of the mobile phone terminal, and the map information creating and distributing procedure in the emergency information reporting device. Accordingly, it is possible that a long time is spent until the user, who receives the urgent warning information, retrieves the map information and makes a decision on the actual evacuation.

An object of the present invention is to enable a user, who receives urgent warning information, to make a quick decision on how to act, after receiving the urgent warning information.

Means for Solving the Problem

According to one aspect of the present disclosure, there is provided a communication terminal including a receiver for receiving a communication signal including urgent warning information; a current location information retrieving unit that retrieves location information regarding a current location of a user; a storage unit that stores information regarding a registered point specified by the user or a communication system; a processing unit that calculates a distance between the current location and the registered point, in response to receiving by the receiving unit of the communication signal; and an information providing unit that provides to-be-provided information including, at least, the distance to the user.

Effect of the Present Invention

According to one embodiment, the user can quickly make a decision on how to act, after receiving the emergency warning information.

EMBODIMENTS FOR CARRYING OUT THE INVENTION

A user's communication terminal that receives a message including urgent warning information such as the Earthquake Early Warning calculates a distance between a current location and a predetermined registered point, and the communication terminal provides to-be-provided information to the user. Here, the to-be-provided information includes, at least, the distance. The predetermined registered point is a place where there is a high risk of occurrence of a disaster. Since information including, for example, the distance between the preregistered point and the current location is provided as the to-be-provided information to the user, the user can quickly determined an extent of the necessary caution against the disaster (e.g., whether it is necessary to leave the current location quickly and to evacuate to a higher place).

Hereinafter, an embodiment is explained while referring to the accompanying drawings. In the drawings, the same reference numerals or the same reference symbols are attached to the same elements. The embodiment is explained from the following perspectives.

1. Communication system
2. Communication terminal
3. Example of basic operations
4. Example of operations for registering a disaster mode
5. Modified example

[Embodiment 1]

<1. Communication System>

Figure 1:
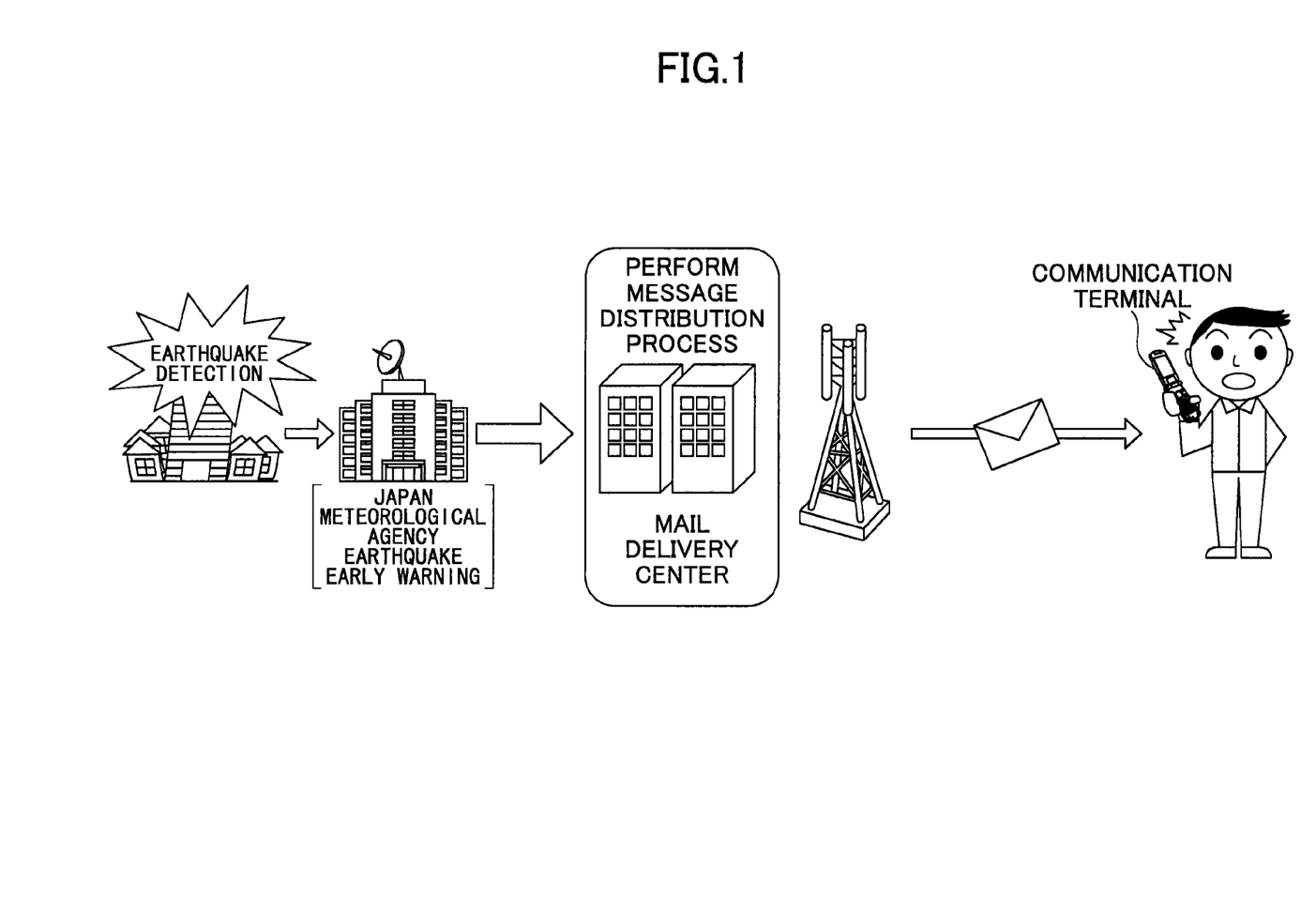
FIG. 1 is a schematic diagram of a communication system that can be used in an embodiment.

FIG. 1 shows a schematic diagram of the communication system that can be used in the embodiment. FIG. 1 shows entities which are particularly related to the embodiment, among various nodes, elements, and processing units included in the communication system. As shown in the figure, when a state of emergency, such as an earthquake, occurs, the Japan Meteorological Agency transmits information regarding the Earthquake Early Warning to an operator of the communication system. The communication system which is indicated as a mail delivery center creates a message of the urgent warning information based on the information received from the Japan Meteorological Agency, specifies a distribution area, and transmits the message. As an example, the mail delivery center is a broadcast transmission device or a cell broadcast center (CBC) in a cell broadcast service (CBS). The broadcast transmission device CBC simultaneously transmits the message of the urgent warning information to users' communication terminals through switching centers and base stations, for example. Such a message may be transmitted through any suitable mobile communication systems. Specific examples of the mobile communication systems include the third generation mobile communication systems (e.g., the W-CDMA system, and the GSM system), the LTE based mobile communication systems, and mobile communication systems based on schemes that will be defined in the future. However, the mobile communication systems are not limited to these. As an example, the message of the urgent warning information may be transmitted as e-mails. For convenience of explanation, the case is explained where the Japan Meteorological Agency observes an earthquake. However, not only the Japan Meteorological Agency, but an organization or an agency having certain authority, such as a local government, may transmit information. Further, not only the Earthquake Early Warning, but any warning information that prompts caution may be transmitted. For example, information such as tsunami warning, tidal wave warning, flood warning, and volcanic phenomena warning may be transmitted. Not only the information attributable to a natural disaster, but also information attributable to a man-made disaster such as an international dispute may be transmitted.

As described later, the user's communication terminal that receives the message including the urgent warning information calculates a distance between the current location and the predetermined registered point, and the communication terminal provides the to-be-provided-information, which includes at least the distance, to the user. The predetermined registered point is a place where there is a high risk of occurrence of disaster. Specifically, the predetermined registered point may be a coastal location, a location where a landslide disaster tends to occur, a location where a dangerous object is handled (e.g., a dangerous facility such as a toxic gas facility, or a nuclear power plant), or the like. The user can quickly determine how to act by knowing whether the place where there is a high risk of occurrence of a disaster is close to the current location.

<2. Communication Terminal>

Figure 2A:
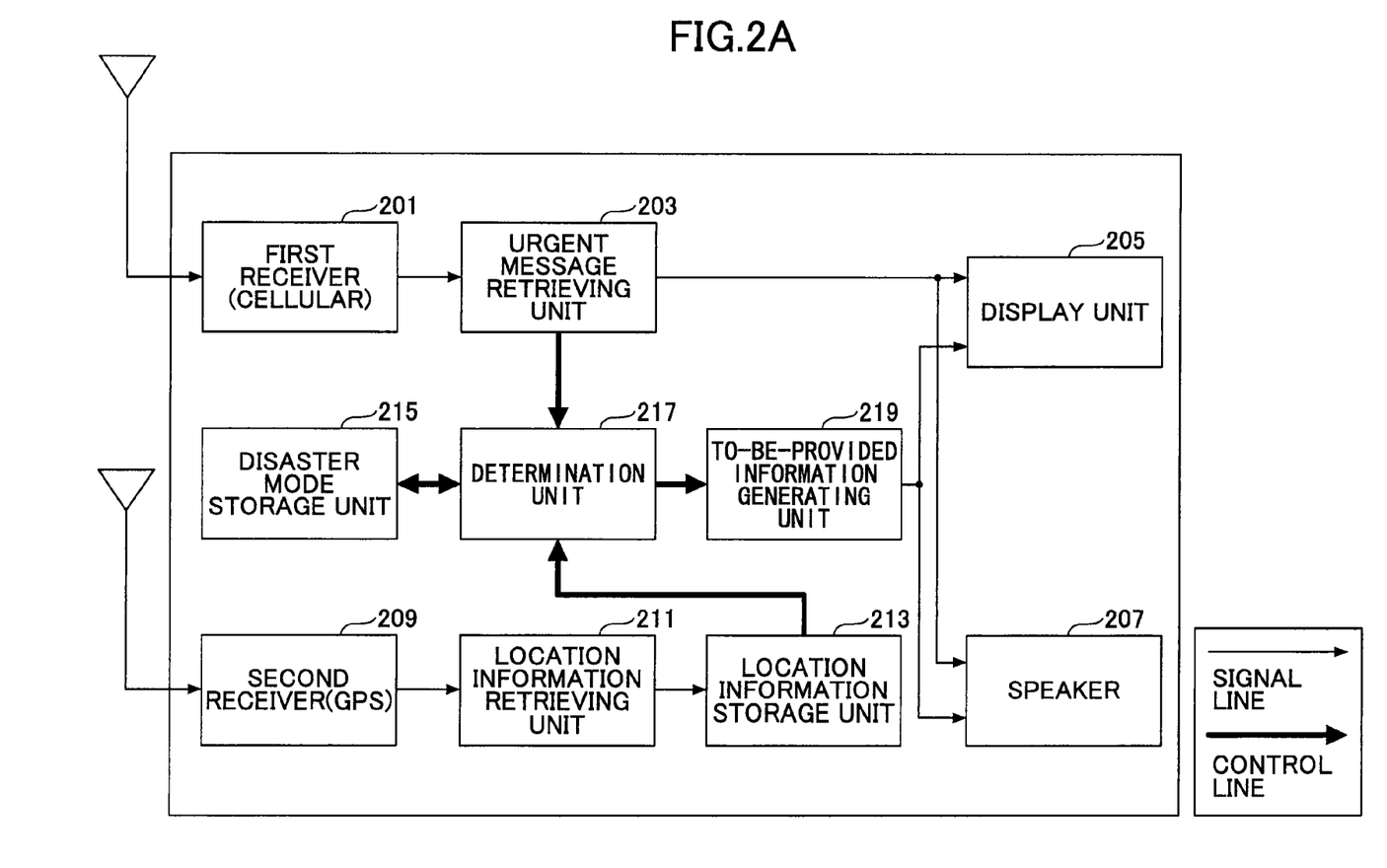
FIG. 2A is a functional block diagram of a communication terminal.

FIG. 2A shows a functional block diagram of the communication terminal according to the first embodiment that can be used in the communication system shown in FIG. 1. FIG. 2A shows entities that are particularly related to the embodiment, among various processing units and functional units included in the communication terminal. The communication terminal may be any suitable user equipment that can receive the urgent warning information and that can retrieve information regarding the current location. Typically, the communication terminal is a mobile phone. However, the communication terminal may be another device. For example, the communication terminal may be an information terminal, a high functionality mobile phone, a smart phone, a tablet computer, a personal digital assistant, a mobile personal computer, a palmtop computer, a laptop computer, or a desktop computer. However, the communication terminal is not limited to these. The communication terminal includes, at least, a first receiver 201; an urgent message retrieving unit 203; a display unit 205; a speaker 207; a second receiver 209; a location information retrieving unit 211; a location information storage unit 213; a disaster mode storage unit 215; a determination unit 217; and a to-be-provided information generating unit 219.

The first receiver 201 receives a radio signal in the communication system through a cellular base station. The receiver 201 includes functional units such as a frequency filter, an amplifier, and a frequency convertor, though they are not shown in the figure for simplicity of the illustration. Specifically, the first receiver 201 receives a notification signal including urgent warning information such as the Earthquake Early Warning.

The urgent message retrieving unit 203 determines whether a signal received by the first receiver 201 includes a message, which includes urgent warning information. When the signal includes the message, which includes the urgent warning information, the urgent message retrieving unit 203 reports the message to the user interfaces (205, 207) and to the determination unit 217.

The display unit 205 is a visual interface that visually outputs information to the user. Specifically, the display unit 205 may be a display, a control panel including a keypad, a cathode-ray tube (CRT), a liquid crystal display (LCD), an organic electroluminescent panel, or a touch screen. However, the display unit 205 is not limited to these. In the embodiment, the display unit 205 is covered with a transparent touch-sensitive panel. The display unit 205 can detect a motion of a finger of the user for controlling the operation of the communication terminal.

The speaker 207 is an audio interface that outputs information to the user by a sound.

The display unit 205 and the speaker 207 are merely examples of the user interfaces included in the communication terminal. The communication terminal may include another user interface. For example, a function of an audio input interface such as a microphone may be included, so that an operation announced by the user can be executed.

The second receiver 209 receives a radio signal for retrieving location information of the communication terminal. Such a radio signal is a radio signal obtained from a satellite of a global positioning system (GPS), for example. Alternatively, as explained in "5. Modified example," a control signal from a cellular base station may be utilized as a radio signal for retrieving the location information of the communication terminal.

The location information retrieving unit 211 retrieves the location information from the radio signal received by the second receiver 209. For a case of a radio signal of the GPS, the information regarding a latitude, a longitude, and a sea level-based altitude of the communication terminal is retrieved from the radio signal as the location information. Alternatively, the location of a cellular base station may be used as the location information of the communication terminal. The location information may be retrieved at any suitable timing. For example, the location information may be periodically obtained. Alternatively, the location information may be obtained in response to a request from the user or the communication system.

The location information storage unit 213 stores the location information retrieved or calculated by the location information retrieving unit 211. The location information storage unit 213 suitably reports the location information to the determination unit 217.

The disaster mode storage unit 215 stores location information of a registered point for each of the disaster modes or for each of the types of the disasters. In other words, the disaster mode storage unit 215 stores the location information of the registered point for each of the one or more disaster modes. The registered point is a location which is specified by the user or the communication system as the place where there is a risk of occurrence of a disaster. The registered point may be a location that is subjectively specified by the user, or the registered point may be a location that is objectively determined based on some criteria, as described later. For one disaster mode, there exists at least one registered point. The disaster mode is an operation mode or a service for providing information to prompt countermeasures for the disaster (typically, which is information indicating whether the current location is close to or far from the location where there is a risk of occurrence of the disaster) to the user. The disaster mode is defined for each of the types of the disasters. For example, a disaster mode for protection against tsunami, a disaster mode for protection against radioactivity, and a disaster mode for protection against a landslide disaster may be considered. These disaster modes and the disaster types are merely examples. The present invention may be applied for any disaster mode (or disaster type). For the case of the disaster mode for protection against the tsunami, the "location where there is a risk of occurrence of a disaster" is a coast. For the case of the disaster mode for protection against the radioactivity, the "location where there is a risk of occurrence of a disaster" is a location of a nuclear plant. For the case of the disaster mode for protection against the landslide disaster, the "location where there is a risk of occurrence of a disaster" is a location of a cliff, for example. The contents stored in the disaster mode storage unit 215 may be kept unchanged, or the contents may be suitably changed or updated.

Figure 2B:
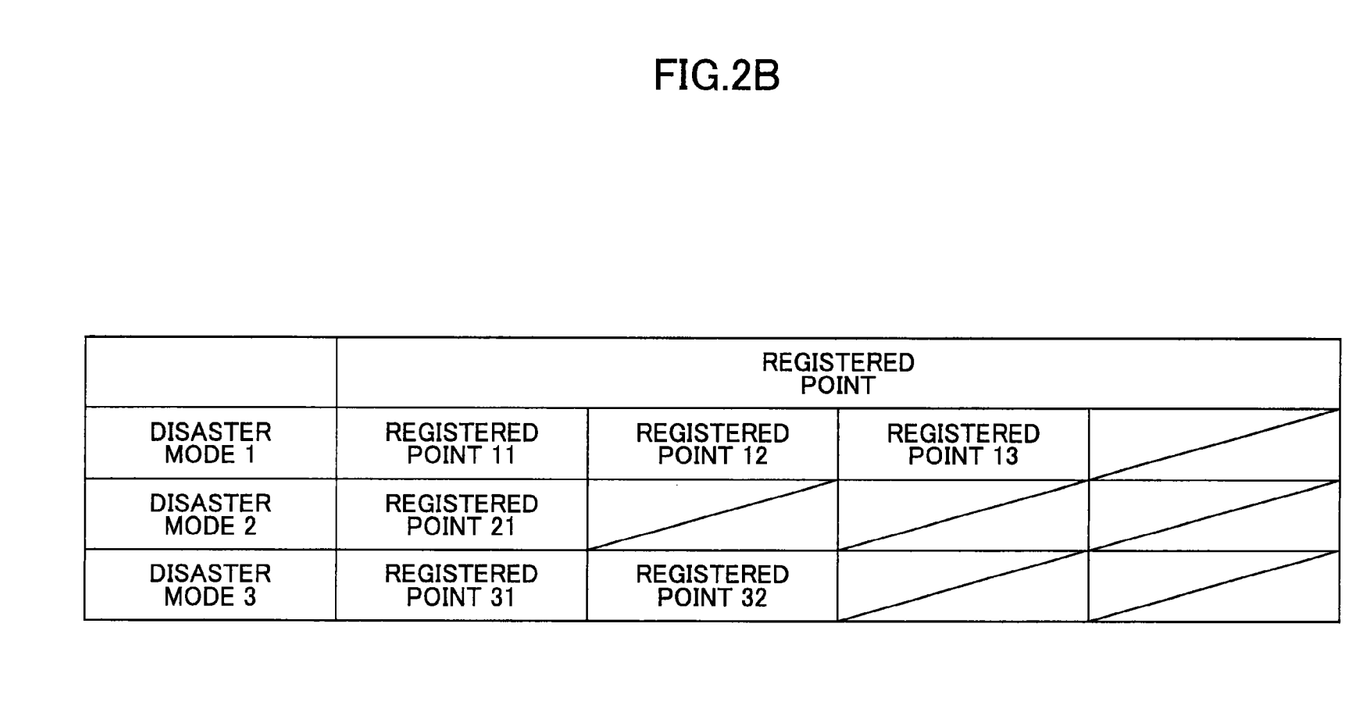
FIG. 2B is a diagram showing a state where information regarding a disaster mode is stored in a disaster mode storage unit.

FIG. 2B shows, by a form of a table, a state where the disaster mode storage unit 215 stores the disaster modes and the registered points (the locations where there is a risk of occurrence of a disaster). For the case of the example shown in the figure, three disaster modes, which are the disaster mode 1, the disaster mode 2, and the disaster mode 3, are registered. With respect to the disaster mode 1, three registered points, which are the registered point 11, the registered point 12, and the registered point 13, are registered. With respect to the disaster mode 2, one registered point, which is the registered point 21, is registered. With respect to the disaster mode 3, two registered points, which are the registered point 31 and the registered point 32, are registered. In this manner, the registration of the disaster mode and the registered point in the disaster mode storage unit 215 may be performed by the user through the user interfaces (e.g., 205). Alternatively, as explained in "4. Example of operations for registering a disaster mode," the registration may be automatically performed in accordance with a predetermined procedure.

In response to receiving a message including the urgent warning information, the determination unit 217 of FIG. 2A retrieves the location information regarding the current location of the communication terminal from the location information storage unit 213. The determination unit 217 calculates, for each of the stored disaster modes, the distance by which the current location is separated from the registered point. For a case where plural disaster modes are registered, the distance between the current location and the registered point is calculated for each of the disaster modes. For a case where plural registered points are registered for a single disaster mode, the distance between the current location and the registered point is calculated for each of the registered points. For example, for a case where the disaster mode for protection against the landslide disaster is registered together with plural registered points corresponding to plural cliffs, the distances between the corresponding plural cliffs and the current location are calculated.

The determination unit 217 outputs the calculated distance to the to-be-provided information generating unit 219. For a case where the location information of the current location stored in the location information storage unit 213 includes height information such as the sea level-based altitude, the determination unit 217 outputs the information regarding the sea level-based altitude to the to-be-provided information generating unit 219 together with the distance. For a case where plural distances are calculated for the corresponding registered points, a priority order may be assigned in an ascending order of the distance. Alternatively, a priority order may be defined in advance for the plural disaster modes or disaster types. For example, a priority order among the disaster mode for protection against the tsunami, the disaster mode for protection against the landslide disaster, and the disaster mode for protection against the radioactivity may be defined in advance in accordance with the descending order of importance.

The determination unit 217 may output all the calculated distances and the disaster modes to the to-be-provided information generating unit 219. Alternatively, the determination unit 217 may output the information regarding the calculated distances and the like to the to-be-provided information generating unit 219, only if the user's current location belongs to a scope of application, which is defined in advance for each of the types of the disasters. For example, the scope of the application for the disaster mode for protection against the tsunami may be such that the user's current location is within 500 meters from the cliff corresponding to the registered point. The scope of the application for the disaster mode for protection against the radioactivity may be such that the user's current location is within 20 kilometers from the nuclear plant corresponding to the registered point. The scope of the application for the disaster mode for protection against the landslide disaster may be such that the user's current location is in an area indicated by a hazard map. As the hazard map, a hazard map provided by the Government, the local government, or an institution having authority may be utilized.

The to-be-provided information generating unit 219 generates to-be-provided information to the user based on the distances calculated by the determination unit 217 and the information which may include the sea level-based altitude depending on a case, and the to-be-provided information generating unit 219 provides the to-be-provided information to the display unit 205 and to the speaker 207. The to-be-provided information is displayed by the display unit 205, or is output by the speaker 207 as sound.

<3. Example of Basic Operations>

Figure 3:
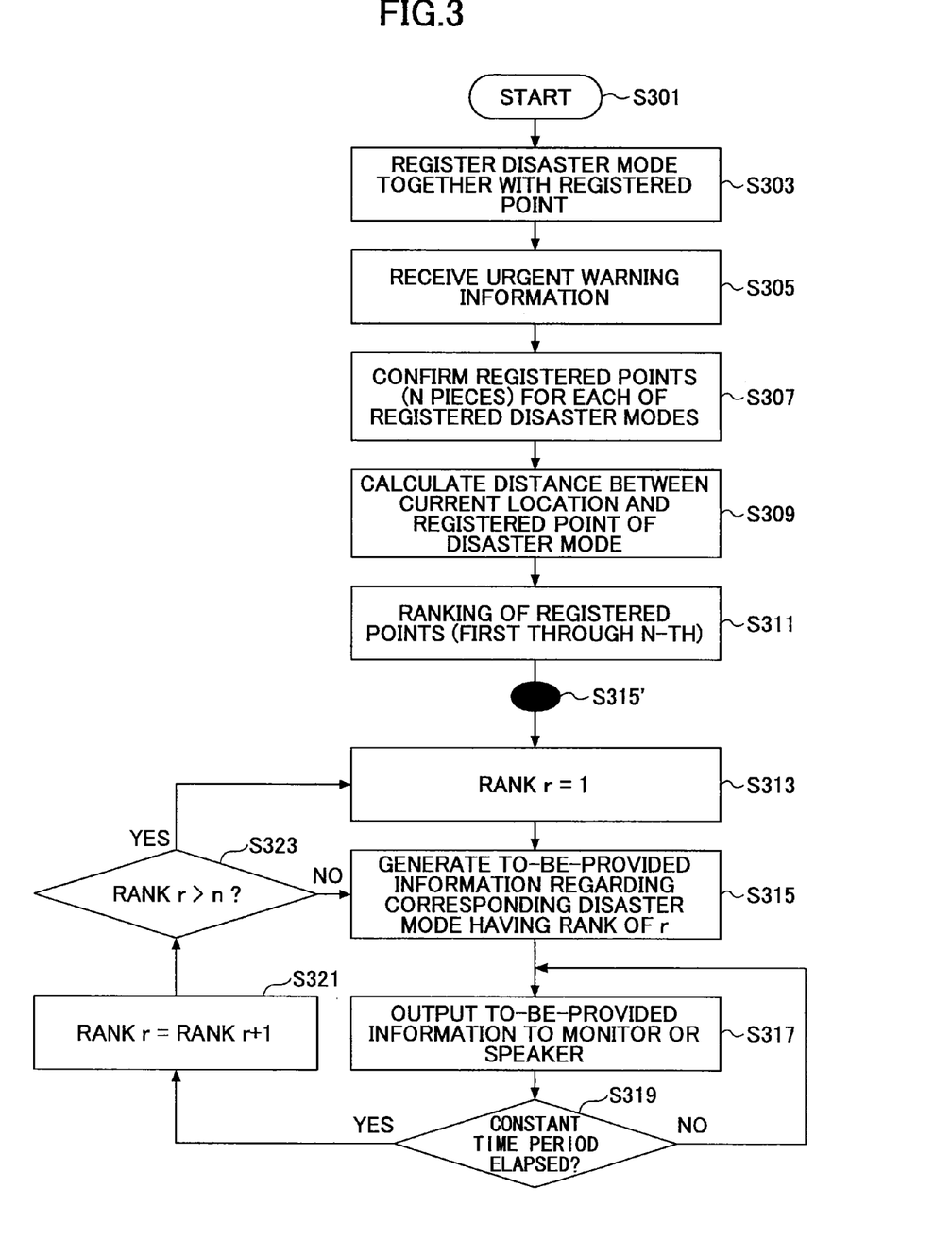
FIG. 3 is a flowchart showing an example of basic operations.

FIG. 3 is a flowchart showing basic operations performed by the communication terminal shown in FIG. 2A. The flow starts from step S301, and the flow proceeds to step S303.

At step S303, the disaster mode is registered in the communication terminal together with the registered point. The registration may be manually performed by the user, or the registration may be automatically performed by the communication terminal. For the case of the manual registration by the user, the disaster mode and the registered point may be input or registered by any suitable method. For example, the communication terminal may prompt designation of disaster modes by showing choices of the disaster modes to the user. Subsequently, inputting of the registered point may be prompted for the disaster mode selected by the user (e.g., for protection against the tsunami, for protection against the radioactivity, or for protection against the landslide disaster). In this case, the user may select the registered point among the choices which are prepared in advance. Alternatively, the registered point may be input by the user by designating a location on a map. Additionally, the registration of the disaster mode and the registered point may be performed based on the name of the disaster mode and a geographical name which are vocalized or announced by the user. An example of the operation for the case where the registration is automatically performed is explained in "4. Example of operations for automatically registering a disaster mode."

At step S305, it is assumed that a state of emergency occurs such as an earthquake, and the communication terminal receives a message including the Earthquake Early Warning (urgent warning information). As an example, such messaging may be performed by the cell broadcast service (CBS) method.

At step S307, the determination unit 217 (FIG. 2A) of the communication terminal retrieves the information regarding the disaster mode and the registered point stored in the disaster mode storage unit 215, and at the same time the determination unit 217 retrieves the location information regarding the current location stored in the location information storage unit 213. In the disaster mode storage unit, one or more disaster modes and one or mode registered points are stored. For the case of the example shown in FIG. 3, the determination unit 217 retrieves the location information regarding n registered points.

At step S309, the communication terminal calculates a distance $L_i$ between the current location and the registered point i (i=1, n).

At step S311, the communication terminal assigns or sets a priority order to the n registered points. The priority order may be set by any suitable method. As an example, when a distance $L_i$ is short, a high priority rank may be attached. That is because, when the distance to the registered point is short, which is the "location where there is a risk of occurrence of a disaster," the location is important for the user. Alternatively, instead of changing the priority order each time, a predetermined priority order may be uniformly utilized. For example, a priority order of the disaster modes for protection against the tsunami, the landslide disaster, and the radioactivity may be fixedly defined in advance in accordance with the descending order of importance. Further, a priority order may be determined by combining the priority order which is fixedly defined in advance and the priority order according to the distance. For example, a priority order of the plural disaster modes is determined in accordance with the priority order which is fixedly defined in advance. For the plural registered points in each of the disaster modes, a priority order which is in accordance with the distances from the current location may be assigned.

At step S313, a parameter r (rank r) for specifying the priority order is set to be one.

At step S315, the communication terminal creates to-be-provided information regarding the disaster mode or the registered point having the priority rank of r.

At step S317, the communication terminal outputs the information regarding the disaster mode or the registered point having the priority rank r from the display unit or the speaker. For example, for a case of the disaster mode for protection against the tsunami, a distance from the coast corresponding to the registered point to the current location and the sea level-based altitude (elevation) are displayed in the display unit. With this, the user can quickly determine a degree of caution to be paid against the tsunami (whether to quickly go away from the current location and to evacuate to a higher place). For the case of the disaster mode for protection against the radioactivity, the distance from the nuclear plant to the current location is displayed in the display unit. For the case of the disaster mode for protection against the landslide disaster, the distance from the cliff corresponding to the registered point to the current location is displayed in the display unit. For the case of outputting the information regarding the distance through the display and/or the speaker, alternatively to or in addition to outputting a concrete numerical value of the distance, information regarding whether the distance to the registered point is very close or information regarding whether to go away from the current location may be output through the display unit and/or the speaker. At step S317, the to-be-provided information can be output at the same time of or immediately after outputting the urgent warning information received at step S305. Alternatively, the to-be-provided information created at step S315 may be created and output so that the to-be-provided information includes the urgent warning information received at step S305 and the information regarding the distance which is calculated at step S309.

At step S319, a determination is made as to whether a constant time period is elapsed. When the constant time period is not elapsed, the flow returns to step S317, and outputting of the same to-be-provided information is continued. When the constant time period is elapsed, the flow proceeds to step S321.

At step S321, the parameter r of the priority rank is incremented by one.

At step S323, a determination is made as to whether the parameter r of the priority rank is greater than the total number n of the registered points. When the parameter r of the priority rank is less than or equal to the total number n of the registered points, the flow proceeds to step S315, and the to-be-provided information regarding the registered point or the disaster mode having the next highest priority order is created. Subsequently, the processes which are already explained are repeated. For convenience of the illustration, the process of creating the to-be-provided information at step S315 and the process of outputting the to-be-provided information into the display unit and the like are alternately performed. However, it is not essential to the embodiment. Instead of step S315, a process of creating the to-be-provided information regarding each of the n registered points (step S315') may be performed between steps S311 and S313.

At step S323, when the parameter r of the priority rank becomes greater than the total number n of the registered points (the case where r=n+1 is satisfied), the flow proceeds to step S313, and the parameter r of the priority rank is reset to be one. Subsequently, the already explained processes are repeated. Namely, the n pieces of the to-be-provided information are sequentially output at corresponding constant time periods in accordance with the priority order. After outputting all the n pieces of the to-be-provided information, the processes are repeated which are for outputting the to-be-provided information having the highest priority rank.

According to the embodiment, information including a distance from a registered point, which is registered in advance, to the current location is provided to the user as the to-be-provided information. Thus, the user can quickly determine an extent of a caution to be paid against a disaster (e.g., whether to go away from the current location quickly and to evacuate to a higher place).

<4. Example of Operations for Registering a Disaster Mode>

As described above, the disaster mode and the registered point may be manually registered by the user, or the disaster mode and the registered point may be automatically registered by the communication terminal.

Figure 4:
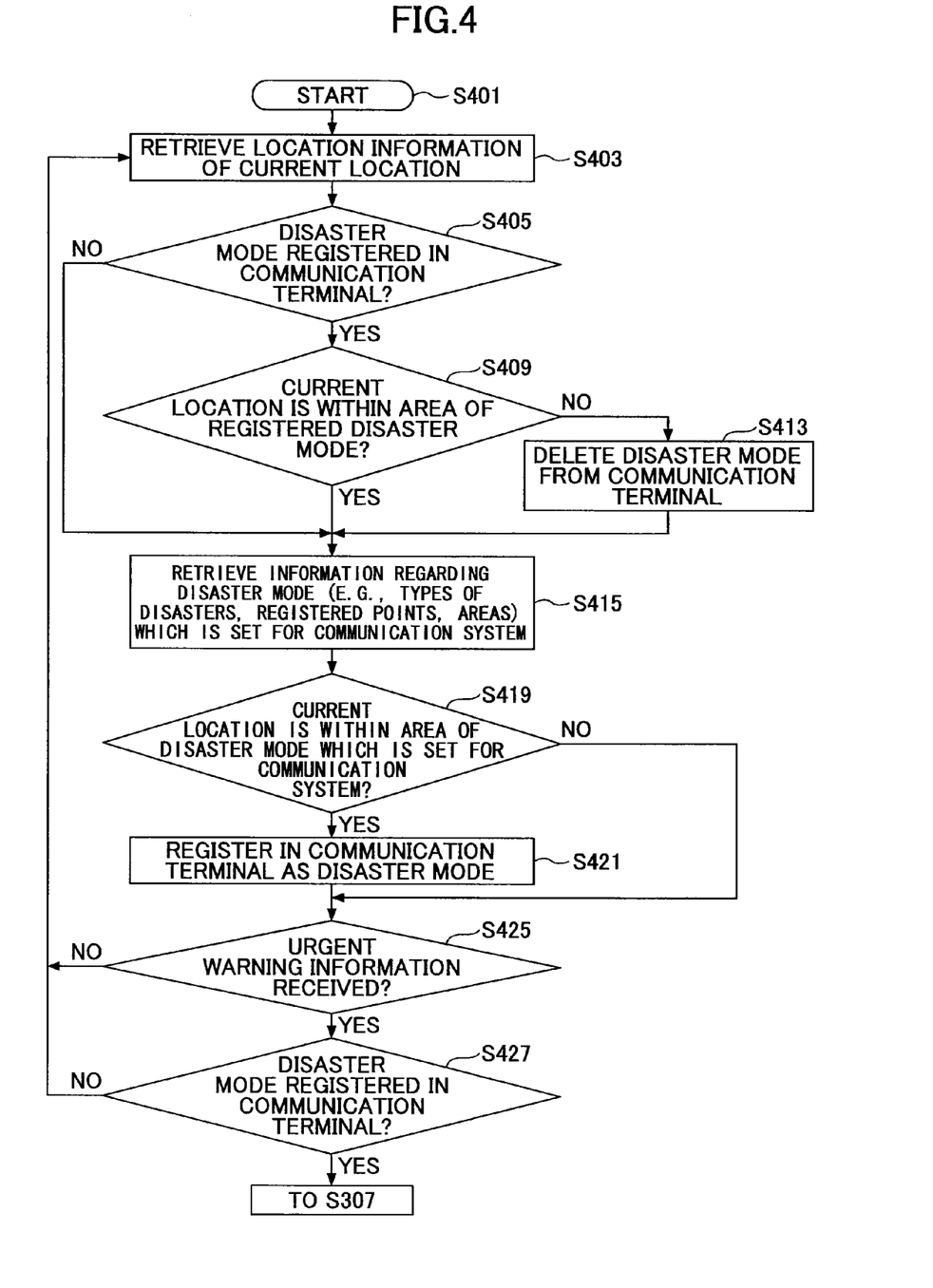
FIG. 4 is a flowchart showing an example of operations for automatically registering the disaster mode.

FIG. 4 is a flowchart of an example of operations for automatically registering the disaster mode. The example of the operations may be used alternatively to steps S303 and S305 of FIG. 3. The flow starts at step S401, and the flow proceeds to step S403.

At step S403, the communication terminal retrieves the location information regarding the current location. The location information may be obtained by any suitable method which is known in the related art. As an example, the location information may be retrieved by using a radio wave from a GPS satellite. The location information may be obtained periodically or on demand.

At step S405, a determination is made as to whether a disaster mode is registered. As described above, the "disaster mode" is an operation mode or a service for providing information to the user, which is for prompting countermeasures against a disaster. In the explanation of FIG. 4, among the plural disaster modes, the registered disaster modes are defined so that the information that prompts countermeasures against a disaster is actually provided to the user. At step S405, a determination is made as to whether such a disaster mode is registered in the communication terminal, and when it is registered, the flow proceeds to step S409.

At step S409, the communication terminal determines whether the current location is within an area of the registered disaster mode. For each of one or more registered disaster modes, one or more registered points are specified. Based on the registered point, the area, the applied area, or the scope of the application of the disaster mode is defined. For example, for the case of the disaster mode for protection against the tsunami, the area may be defined to be a range which is within 500 meters from the coast. For the case of the disaster mode for protection against the landslide disaster, the area may be defined to be a range which is indicated by a hazard map. As the hazard map, for example, a hazard map provided by the Government, the local government, or an institution having authority may be utilized. As an example, the information of the hazard map which is provided by the Ministry of Land, Infrastructure, Transport and Tourism may be utilized. For the case of the hazard mode for protection against the radioactivity, the area may be defined to be a range which is within 20 kilometers from the nuclear power plant. For the disaster mode for other types of disasters, corresponding areas may be defined. In any event, the area is determined from a perspective of whether the current location is close to the registered point, to the extent that the information, which is for prompting countermeasures against the disaster, is to be provided to the user, when the urgent warning information is issued. The specific numerical values shown in the explanation are for an exemplifying purpose only, and any suitable numerical values may be used.

In this manner, at step S409, a determination is made as to whether the current location of the communication terminal is within an area, which is based on the registered point. For the case where there are plural registered points for a single disaster mode, an area is defined for each of the plural registered points, and a determination is made as to whether the current location is within each of the plural areas. When the determination is made that the current location is within the area, the flow proceeds to step S415.

When the determination is made, at step S409, that current location of the communication terminal is not within an area of the disaster mode, the flow proceeds to step S413. For example, for the disaster mode for protection against the tsunami, suppose that the previously measured location is only 100 meters from the coast corresponding to the registered point, and the current location which is measured for this time is separated from the coast corresponding to the registered point by several tens of kilometers, because of transportation by a car. In this case, practical benefits are scarce for providing information to the user, which is created by the disaster mode for protection against the tsunami. Accordingly, the disaster mode, for which the current location is determined not to be within the area at step S409, is deleted from the communication terminal at step S413.

Here, the determination as to whether it is within the area at step S409 and the deletion of the disaster mode at step S413 are performed for each time the current location information is retrieved at step S403 (for each time of updating the current location information).

When the disaster mode is not registered in the communication terminal at step S405, when the current location is within the area at step S409, or after step S413, the flow proceeds to step S415.

At step S415, the information regarding the disaster mode, which is set in the communication system, is retrieved. The information includes information regarding the type of the disaster, the registered point, and the area (the scope of the application), for example. The information may be stored in advance in the disaster mode storage unit, or the information may be taken in the communication terminal through a network, periodically or on demand, so that the information is suitably updated.

At step S419, a determination is made as to whether the current location of the communication terminal is within the area of the disaster mode, which is set in the communication system. For each of the one or more disaster modes which are set in the communication system, one or more registered points are specified. The area of the disaster mode is defined based on the registered point. Namely, the area is determined in advance for each of the disaster modes or for each of the types of the disasters. Here, the determination as to whether it is within the area at step S419 is made for each time the current location information is retrieved at step S403.

When the determination is made, at step S419, that the current location is within the area, the disaster mode is registered in the communication terminal at step S421.

After the registration of the disaster mode at step S421, the flow proceeds to step S425. When the determination is made that the current location is not within the area at step S419, the flow also proceeds to step S425.

At step S425, the communication terminal determines whether a message including the Earthquake Early Warning (the urgent warning information) is received. When such a message is not received, the flow returns to step S403, and a registration state of the disaster mode is updated to be the latest state by performing the already explained processes.

When the communication terminal receives the message including the Earthquake Early Warning (the urgent warning information) at step S425, the flow proceeds to step S427, and a determination is made as to whether the disaster mode is registered in the communication terminal. When it is not registered, the flow returns to step S403, and the registered state of the disaster mode is updated to be the latest state by performing the already explained processes.

When the disaster mode is registered in the communication terminal at step S427, the flow proceeds to step S307 of FIG. 3, and the already explained processes are performed.

By performing the operations shown in FIG. 4, among various disaster modes which are set in the communication system, the disaster modes which are suitable for the current location of the communication terminal are registered at step S421, and the disaster modes which are not suitable for the current location of the communication terminal are deleted at step S413. In this manner, even if the user fails to manually input the registered point in advance, the disaster modes which are suitable for the current location of the user can be registered in the communication terminal. This is particularly advantageous when the user goes to a distant place for a business trip.

<5. Modified Example>

As described above, when the communication terminal retrieves the location information of the current location, the location information may be obtained from the radio waves in the GPS system, or the location information may be retrieved by another method. For example, for a case where the communication terminal functions as a mobile telephone, since the communication terminal can find the base station of the serving cell, the location of the base station of the serving cell may substitute as the current location of the communication terminal.

Figure 5:
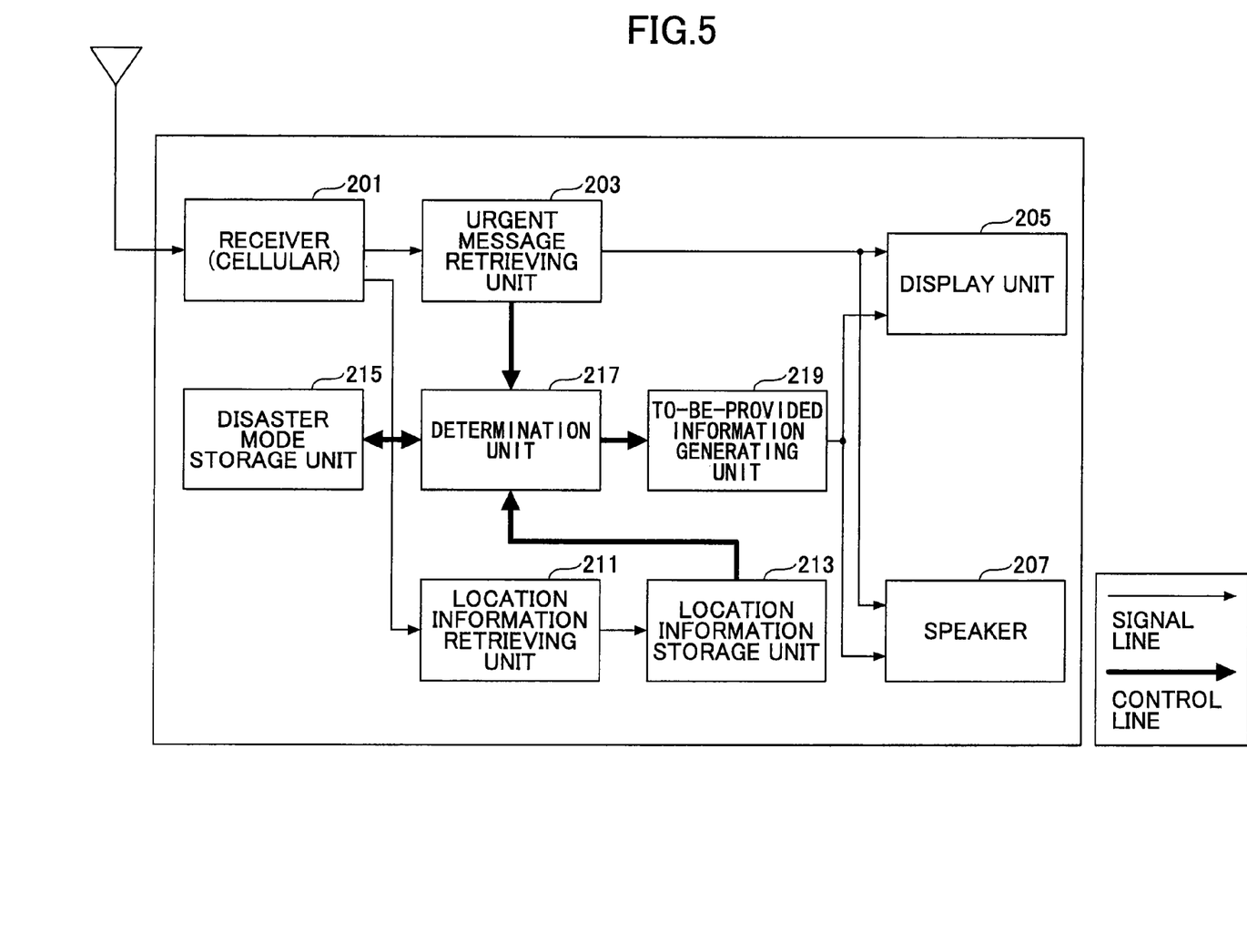
FIG. 5 is a functional block diagram of the communication terminal used in a modified example.

FIG. 5 shows a modified example for a case where the location of the base station of the serving cell substitutes as the current location of the communication terminal. In general, the communication terminal shown in FIG. 5 is the same as the communication terminal shown in FIG. 2A. However, the communication terminal shown in FIG. 5 is significantly different from the communication terminal shown in FIG. 2A in a point that the communication terminal shown in FIG. 2A includes the second receiver 209, whereas the GPS receiver may be omitted in the communication terminal shown in FIG. 5. For the case of the example shown in FIG. 5, the receiver 201 reports a control signal received from a radio base station to the location information retrieving unit 211. The location information retrieving unit 211 extracts identifying information of the base station from the control signal, and thereby the location information retrieving unit 211 retrieves the location information of the base station. The information regarding which base station is located at which location is information that can be retrieved in advance by the communication terminal. The location information determined by the location of the base station is stored in the location information storage unit 213, and the location information is provided to the determination unit 217 depending on necessity.

In the communication terminal according to the modified example, the precision of the current location is degraded compared to that of FIG. 2A. However, the communication terminal according to the modified example is preferable from a perspective that the communication terminal can be simplified.

Hereinabove, the present invention is explained by referring to the specific embodiments. However, the embodiments are merely illustrative, and variations, modifications, alterations and substitutions could be conceived by those skilled in the art. For example, the present invention may be applied to any suitable mobile communication system that transmits a message including urgent warning information. Specific examples of numerical values are used in order to facilitate understanding of the invention. However, these numerical values are simply illustrative, and any other appropriate values may be used, except as indicated otherwise. The separations of the embodiments or the items are not essential to the present invention. Depending on necessity, subject matter described in two or more items may be combined and used, and subject matter described in an item may be applied to subject matter described in another item (provided that they do not contradict). It is not always true that the boundaries of the functional units or the processing units in the functional block diagram correspond to boundaries of physical components. The operations by the plural functional units may be physically performed by a single component. Alternatively, the operations by the single functional unit may be physically performed by plural components. For the convenience of explanation, the devices according to the embodiments of the present invention are explained by using functional block diagrams. However, these devices may be implemented in hardware, software, or combinations thereof. The software may be prepared in any appropriate storage medium, such as a random access memory (RAM), a flash memory, a read-only memory (ROM), an EPROM, an EEPROM, a register, a hard disk drive (HDD), a removable disk, a CD-ROM, a database, a server, and the like. The present invention is not limited to the above-described embodiments, and various variations, modifications, alterations, substitutions and so on are included, without departing from the spirit of the present invention.

The present application claims priority based on Japanese Patent Application No. 2011-153295, filed on Jul. 11, 2011, the entire contents of which are hereby incorporated by reference.

LIST OF REFERENCE SYMBOLS

201: First receiver
203: Urgent message retrieving unit
205: Display unit
207: Speaker
209: Second receiver
211: Location information retrieving unit
213: Location information storage unit
215: Disaster mode storage unit
217: Determination unit
219: To-be-provided information generating unit

The invention claimed is:

1. A communication terminal comprising:
   processing circuitry;
   a receiver configured to receive a communication signal including urgent warning information;
   a current location information retrieving unit, implemented by the processing circuitry, that retrieves location information regarding a current location of a user;
   a memory that stores, for each of types of disasters, a disaster mode that is an operation mode or service for providing information that is for prompting countermeasure against a disaster to the user, wherein the memory stores, for each of one or more disaster modes, information regarding a registered point specified by the user or a communication system;
   a processing unit, implemented by the processing circuitry, that calculates a distance between the current location and the registered point, in response to receiving by the receiver of the communication signal; and
   an information providing unit, implemented by the processing circuitry, that provides notification information to be displayed at the communication terminal, the notification information including, at least, the distance between the current location and the registered point and sea-level based altitude information of the user, if and only if the receiver receives the communication signal including the urgent warning information and the current location of the user belongs to a scope of an application, the notification information not being displayed at the communication terminal if the receiver does not receive the communication signal including the urgent warning information or the current location of the user does not belong to a scope of an application, wherein the scope of the application is defined in advance for each of the types of the disasters based on a predefined maximum distance required between a current location and the registered point, the predefined maximum distance being different for each of the types of disasters.

2. The communication terminal according to claim 1, wherein the information providing unit provides, for each of the types of the disasters, the notification information including, at least, the distance to the user.

3. The communication terminal according to claim 2, wherein the information providing unit provides, for each of the types of the disasters, the notification information including, at least, the distance to the user, in accordance with a priority order such that a priority becomes higher as the distance becomes smaller.

4. The communication terminal according to claim 2, wherein the information providing unit provides, for each of the types of the disasters, the notification information including, at least, the distance between the current location and the registered point, in accordance with a priority order regarding the types of the disasters, wherein the priority order is determined prior to receiving by the receiver of the communication signal.

5. The communication terminal according to claim 1, wherein the current location information retrieving unit retrieves the location information regarding the current location of the user, based on a radio signal received by a GPS receiver.

6. The communication terminal according to claim 1, wherein the current location information retrieving unit retrieves the location information regarding the current location of the user, based on a location of a cellular radio base station.

7. The communication terminal according to claim 1, wherein, when a current location of the communication terminal is within an area of one of the disaster modes, the one of the disaster modes is registered in the communication terminal.

8. The communication terminal according to claim 1, wherein the communication system stores, in advance, a plurality of disaster modes and a plurality of areas that are associated with the plurality of disaster modes, respectively, wherein, when the communication terminal enters one area that is associated with one disaster mode of the plurality of disaster modes, and when the one disaster mode is not stored in the memory, the communication terminal retrieves the one disaster mode from the communication system, and the communication terminal stores the one disaster mode in the memory.

9. An information providing method to be executed by a communication terminal, the method comprising steps of:
   retrieving location information regarding a current location of a user;
   extracting, in response to receiving a communication signal including urgent warning information, information regarding a registered point specified by the user or a communication system from a memory that stores, for each of types of disasters, a disaster mode that is an operation mode or service for providing information that is for prompting counter measure against a disaster to the user, wherein the memory stores, for each of one or more disaster modes, the information regarding the registered point specified by the user or the communication system, and calculating a distance between the current location and the registered point; and
   providing notification information to be displayed at the communication terminal, the notification information including, at least, the distance between the current location and the registered point and sea-level based altitude information of the user, if and only if the receiver receives the communication signal including the urgent warning information and the current location of the user belongs to a scope of an application, the notification information not being displayed at the communication terminal if the receiver does not receive the communication signal including the urgent warning information or the current location of the user does not belong to a scope of an application, wherein the scope of the application is defined in advance for each of the types of the disasters based on a predefined maximum distance required between a current location and the registered point, the predefined maximum distance being different for each of the types of disasters.

10. The method according to claim 9, wherein the information providing method includes a step of registering one of the disaster modes when a current location of the communication terminal is within an area of one of the disaster modes.

* * * * *